(12) United States Patent
Schmidt et al.

(10) Patent No.: US 10,583,749 B2
(45) Date of Patent: Mar. 10, 2020

(54) BATTERY SYSTEM AND METHOD FOR THE OPERATION THEREOF

(71) Applicant: Dr. Ing. h.c. F. Porsche Aktiengesellschaft, Stuttgart (DE)

(72) Inventors: Tim Schmidt, Freiberg am Neckar (DE); Mikel Fauri, Ludwigsburg (DE); Hermann Dibos, Remchingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 56 days.

(21) Appl. No.: 15/925,963

(22) Filed: Mar. 20, 2018

(65) Prior Publication Data
US 2018/0272883 A1 Sep. 27, 2018

(30) Foreign Application Priority Data
Mar. 21, 2017 (DE) .......... 10 2017 106 058

(51) Int. Cl.
| | |
|---|---|
| B60L 53/60 | (2019.01) |
| H01M 2/34 | (2006.01) |
| H02J 7/00 | (2006.01) |
| H01M 2/20 | (2006.01) |
| B60L 58/20 | (2019.01) |
| B60L 53/14 | (2019.01) |
| H01M 10/44 | (2006.01) |

(52) U.S. Cl.
CPC .............. *B60L 53/60* (2019.02); *B60L 53/14* (2019.02); *B60L 58/20* (2019.02); *H01M 2/206* (2013.01); *H01M 2/348* (2013.01); *H02J 7/0026* (2013.01); *H02J 7/0031* (2013.01); *H01M 10/441* (2013.01); *H01M 2200/103* (2013.01); *H01M 2220/20* (2013.01); *Y02T 10/7005* (2013.01)

(58) Field of Classification Search
CPC .. H01M 2/206; H01M 2/348; H01M 2220/20; H02J 7/0031; H02J 7/0026; B60L 58/20; B60L 53/60; B60L 53/14; Y02T 10/7005
USPC ....................................................... 320/109
See application file for complete search history.

(56) References Cited

U.S. PATENT DOCUMENTS

| | | | |
|---|---|---|---|
| 5,477,936 A | 12/1995 | Sugioka et al. | |
| 5,548,200 A * | 8/1996 | Nor ................. | B60L 53/305 320/109 |
| 5,644,208 A | 7/1997 | Abiven | |
| 5,939,861 A * | 8/1999 | Joko ................. | B60K 6/28 320/122 |

(Continued)

FOREIGN PATENT DOCUMENTS

| | | |
|---|---|---|
| DE | 102015101182 A1 | 7/2016 |
| JP | 2009038948 A | 2/2009 |

(Continued)

OTHER PUBLICATIONS

German Search Report for German Application No. 10 2017 106 058.8, dated Dec. 13, 2017 with partial English translation, 8 pages.

(Continued)

*Primary Examiner* — M Baye Diao
(74) *Attorney, Agent, or Firm* — RatnerPrestia

(57) ABSTRACT

A battery system, in particular for a motor vehicle, to a power supply comprising the battery system for an electric machine, in particular a vehicle drive, and to a method for charging the battery system.

12 Claims, 3 Drawing Sheets

(56) References Cited

U.S. PATENT DOCUMENTS

| | | |
|---|---|---|
| 8,564,245 B2 | 10/2013 | Bosch et al. |
| 8,704,485 B1 | 4/2014 | Tsukamoto et al. |
| 8,710,795 B2 * | 4/2014 | Scheucher .......... B60L 11/1861 320/104 |
| 9,079,505 B1 * | 7/2015 | Hyde ................. G06Q 10/0631 |
| 9,130,651 B2 * | 9/2015 | Tabe ................... H04B 1/3838 |
| 9,203,248 B2 * | 12/2015 | Ohkawa ................ B60L 3/0046 |
| 2009/0066292 A1 | 3/2009 | Jao |
| 2012/0175953 A1 * | 7/2012 | Ohkawa ................ B60L 3/0046 307/18 |
| 2016/0272084 A1 | 9/2016 | Chuang |
| 2017/0126035 A1 * | 5/2017 | Tosch ................. G06F 17/5095 |

FOREIGN PATENT DOCUMENTS

| | | |
|---|---|---|
| JP | 2011078184 A | 4/2011 |
| KR | 20110116155 A | 10/2011 |
| KR | 20130076507 A | 7/2013 |

OTHER PUBLICATIONS

English Translation of the Korean Office Action for Korean Application No. 10-2018-0030634, dated Dec. 30, 2019, 3 pages.

* cited by examiner

BATTERY SYSTEM AND METHOD FOR THE OPERATION THEREOF

CROSS-REFERENCE TO RELATED APPLICATIONS

This application claims priority to German Patent Application No. DE 10 2017 106 058.8, filed Mar. 21, 2017, which is incorporated by reference herein in its entirety.

FIELD OF THE INVENTION

The invention relates to a battery system, in particular for a motor vehicle, to a power supply comprising the battery system for an electric machine, in particular a vehicle drive, and to a method for charging the battery system.

BACKGROUND OF THE INVENTION

A motor vehicle that has and uses at least one electric motor for driving or moving is referred to as an electric vehicle or a hybrid vehicle. In this case, during a driving operation of the motor vehicle, the at least one electric motor can be supplied with electrical energy from at least one electrical energy store, which can also be referred to as a battery or rechargeable battery. Said at least one electrical energy store can be, for example, a high-voltage battery (HV battery). Said high-voltage battery can in turn be supplied with electrical energy in a charging operation.

The trend in the development of HV batteries is for batteries having a higher rated voltage. As a result, the cable dimensions and the weight of the electrical components in the vehicle can be reduced since, given an increasing voltage, lower current intensities are required for reaching a desired power. An increase in the voltage is associated with additional requirements not just for the components in the vehicle but also for the external infrastructure required to charge the HV battery. Charging stations having a rated voltage of more than 800 V are hardly available at present. It would therefore be desirable for HV battery systems of this kind to also be able to be charged using the currently available charging infrastructure.

HV batteries usually contain a plurality of battery modules. In order to limit the damage in the case of an internal short circuit, electrical fuses are normally provided between the modules. Said fuses must be able to be replaced easily so that in the event of a failure the mean time to repair (MTTR) is as short as possible.

US 2016/272084 A1, which is incorporated by reference herein, discloses a charging system for a vehicle battery set, wherein a plurality of charging devices are each connected to a corresponding number of battery module sections of the battery set.

U.S. Pat. No. 5,477,936 A, which is incorporated by reference herein, discloses a vehicle battery set having a plurality of battery arrangements and having a fuse connected in series between each battery arrangement and the plug in order to provide an interface for the actuating circuit.

U.S. Pat. No. 8,704,485 B1, which is incorporated by reference herein, discloses a vehicle battery set having batteries that are arranged in a plurality of sections and switch fuses that are connected in series with each battery module.

Furthermore, it is desirable to have a simple option for isolating the battery from the internal circuit and for making the connections thereof potential-free so that safe assembly, disassembly or transport of the HV battery is possible.

SUMMARY OF THE INVENTION

It is therefore an object of the invention to provide a battery system having a high rated voltage and that can be charged using charging devices whose output voltage is lower than the rated voltage of the battery system. It is a further object of the invention to provide a battery system of this kind that can be repaired simply and quickly after an internal short circuit. A further object consists in being able to assemble, disassemble and transport the battery system safely.

The present invention provides a HV battery, in particular for a vehicle. The HV battery has an internal isolation such that no voltage is applied to the connections. The assembly, disassembly and transport of the battery are therefore safe. The HV battery comprises a series circuit of a plurality of cells, which are divided into sections. Conductors connect the positive and negative connections of the cells to an interface. The interface also has poles for connection to the intermediate electrodes of the battery.

When the battery is in the discharge mode, it is connected to the on-board converter. The intermediate electrodes are connected in series with intermediate fuses between the connections on the other side of the interface. The intermediate fuses are arranged in this way outside of the battery housing, which reduces the weight and size thereof.

A divided charging connection system is further provided. In the charge mode of the battery, a plurality of charging devices are each connected to a battery section using the intermediate electrodes in order to charge the sections in parallel. This makes it possible to use less powerful charging devices having a lower voltage range.

The subject of the invention is a battery system, which comprises at least two modules each having at least two cells connected in series. The battery system comprises a first interface, which has a number of connections equal to double the number of modules. Each pole of the modules is in each case connected by means of a conductor to a respective connection of the first interface. The conductors that connect the positive poles of the modules to the first interface each have a switch, which is open when the associated connection of the first interface is open.

In one embodiment, the battery system is a HV battery system. In one embodiment, the sum of the voltages of the modules is greater than 800 V, for example greater than 1000 V or else greater than 1200 V.

In one embodiment of the battery system, the first interface is embodied as a HV plug connector. The first interface can be embodied, for example, as a multi-pole socket or as a multi-pole plug.

The switches arranged in the conductors that connect the positive poles of the modules to the first interface can be embodied as mechanical switches that can be operated from the outer side of the battery system. In one embodiment, the switches are magnetically operated reed switches. Said switches are preferably embodied as electrically operated switches. In one embodiment, said switches are embodied as relays. In one embodiment, said switches are embodied as electronic switches, for example as transistors.

The subject of the invention is also a power supply for an electric machine, in particular a vehicle drive, comprising a battery system according to aspects of the invention. The power supply comprises a second interface having the same number of connections as the first interface of the battery system. Each connection of the second interface is connected respectively to a connection of the first interface. A number of fuses corresponding to the number of modules in the battery system reduced by 1 is connected to the second interface in such a way that each fuse is connected respectively to the positive pole of one or the modules or the battery system and to the negative pole of another of the modules of the battery system. All the modules of the battery system are thus connected in series by means of the fuses. The power supply also comprises a converter. The input of the converter is connected to the two remaining connections of the second interface such that the sum of the voltages of the modules of the battery system is applied to the input of the converter.

The converter converts the voltage of the battery module to the voltage required to operate the electric machine. Depending on the type of electric machine used, a converter that generates a DC voltage or an AC voltage at the required number of volts is used. In one embodiment, the converter comprises an inverter. In a further embodiment, the converter comprises a step-down converter.

The fuses protect the modules of the battery system against damage from overvoltage or to excessive currents. Suitable fuses are known in principle to those skilled in the art. Examples are safety fuses, electronic fuses, self-resetting fuses such as bimetal fuses or PTC thermistors, line circuit breakers, etc.

The second interface is embodied as a counterpart to the first interface such that each connection of the first interface is connected to the corresponding connection of the second interface. If, for example, the first interface is embodied as a multi-pole socket, the second interface represents the corresponding counterpart, that is to say a multi-pole plug. In another embodiment, the first interface is embodied as a multi-pole plug and the second interface is embodied as a multi-pole socket. In one embodiment, the first interface and the second interface together form a HV plug connection.

The subject of the invention is also a method for charging a battery system containing a plurality of modules, wherein at least one charging device is connected to at least one module of the battery system and charged.

In one embodiment of the method, each module of the battery system is connected to a charging device and charged.

In one embodiment of the method, a plurality of charging devices are in each case connected simultaneously to at least one module of the battery system and the modules connected to the charging devices are charged simultaneously. In one embodiment, the number of charging devices is equal to the number of modules in the battery system, that is to say that each module of the battery system is connected in each case to one charging device and all the modules are charged simultaneously.

BRIEF DESCRIPTION OF THE DRAWINGS

The invention is schematically illustrated in the drawings with reference to embodiments and is described schematically and in detail with reference to the drawings.

The FIGS. will be described in an interrelated and overarching manner. Identical reference numerals denote the same components.

DETAILED DESCRIPTION OF THE INVENTION

Figure 1:
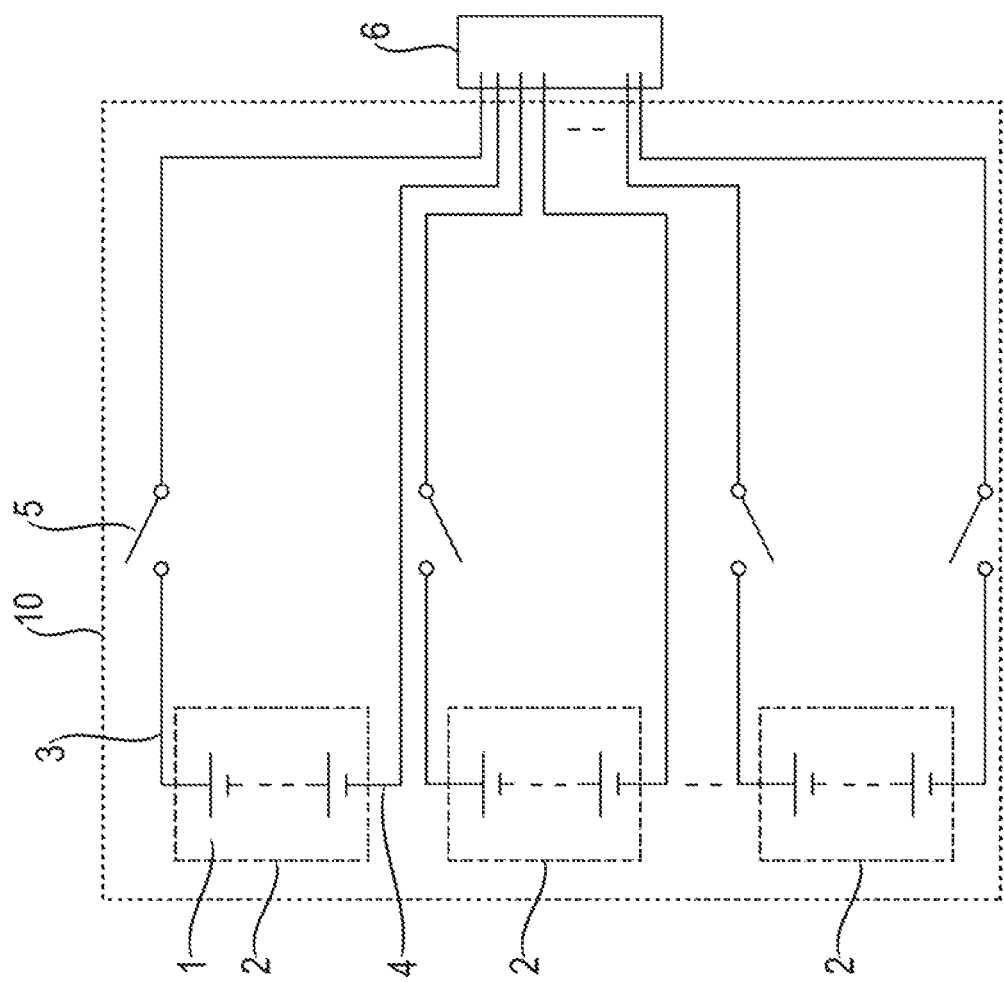
FIG. 1 shows a schematic illustration of an embodiment of the battery system according to aspects of the invention.

FIG. 1 shows a battery 10, which contains M cells connected in series, said cells being divided into N sections or modules 2. A conductor 4 leads from the negative pole of the $(i*M/N+1)$th ($i=1 \ldots N-1$) cell to the interface 6 of a HV connection. A further conductor 3 leads from the positive pole of the $(i*M/N)$th ($i=1 \ldots N-1$) cell to the interface 6 of a HV connection. The interface 6 has 2× N poles, two for the positive pole and the negative pole of the battery 10 and the rest for the intermediate poles in the battery 10. Switches 5 are provided in the conductors 3 that connect the positive poles of the modules 2 to the interface 6, said switches being open when the contacts of the interface 6 are open, that is to say are not connected either to a load or to a charging device. In the embodiment illustrated in FIG. 1, another switch 5 is additionally provided in the conductor 4, said switch connecting the negative pole of the last of the cascading modules 2, that is to say connecting the negative pole of the battery 10, to the interface 6.

When the battery 10 is not connected, no voltage is applied to the interface 6 and the connections of the interface 6 are potential-free. Safe handling and safe transport of the battery 10 are ensured as a result. This corresponds to opening the central interrupter between the battery packs or to removing the internal switch fuse between the battery packs in batteries of conventional design.

The design of the battery system according to aspects of the invention makes the use of a central interrupter superfluous, as a result of which weight and volume are saved. The switch fuses between the modules are found outside of the battery housing, which makes it possible to further save on weight and volume. In addition, this significantly facilitates the replacement of faulty fuses.

Figure 2:
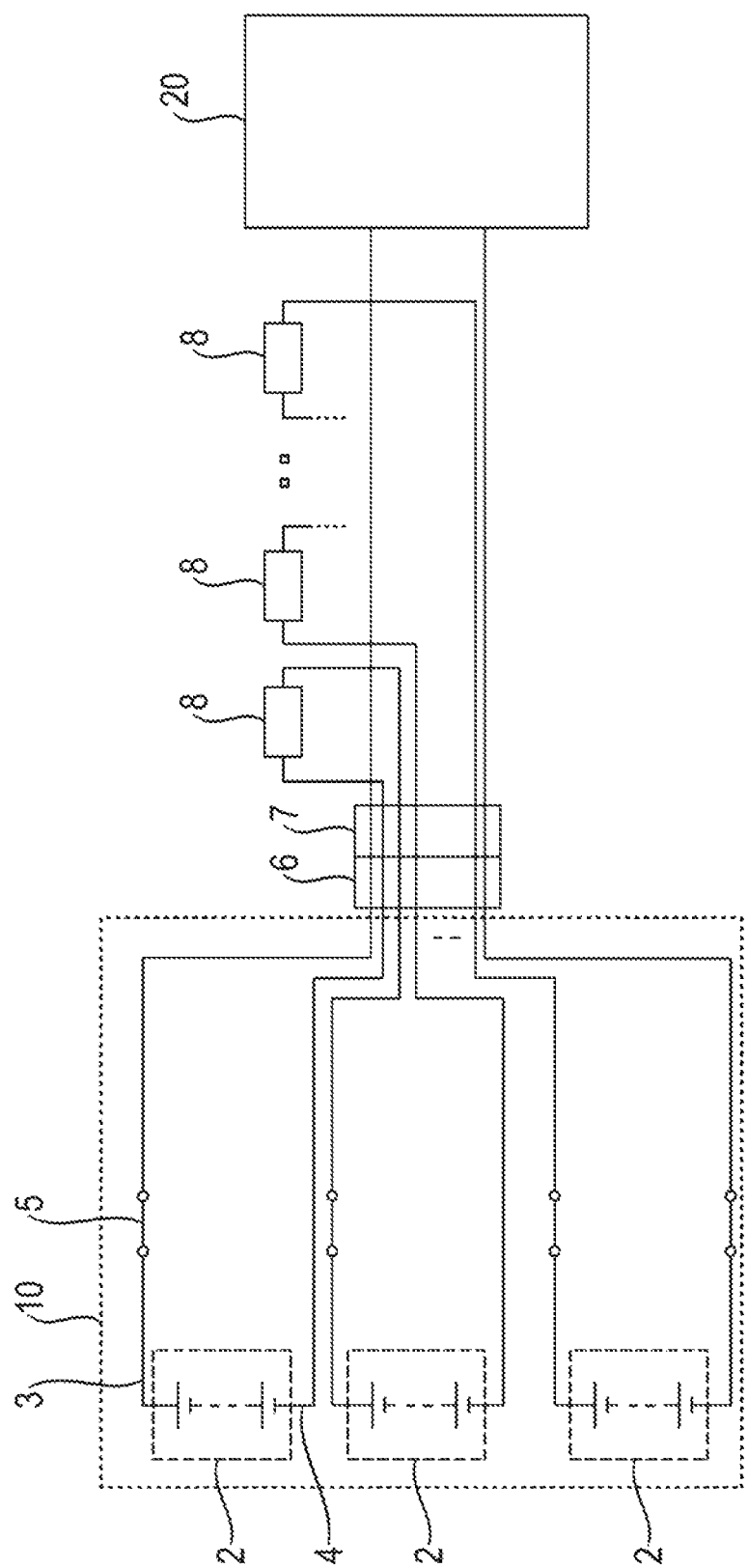
FIG. 2 shows a schematic illustration of an embodiment of the power supply according to aspects of the invention.

FIG. 2 shows an embodiment of the power supply according to aspects of the invention for an electric machine. The battery 10 is connected to a second interface 7 by means of the first interface 6. The interfaces 6 and 7 are, for example, the two halves of a HV plug connection. The positive pole and the negative pole of the battery 10 are connected to the input of a converter 20, which converts the battery voltage to a voltage suitable for the operation of the electric machine (not shown in FIG. 2). The intermediate poles of the battery 10 are connected in series and N−1 fuses 8 are arranged between the intermediate poles such that cascading modules 2 are in each case connected by means of a fuse 8. The sum of the individual voltages of the modules 2 is therefore applied to the input of the converter 20. In the discharge mode, all the switches 5 in the battery 10 are closed and a current can flow.

Figure 3:
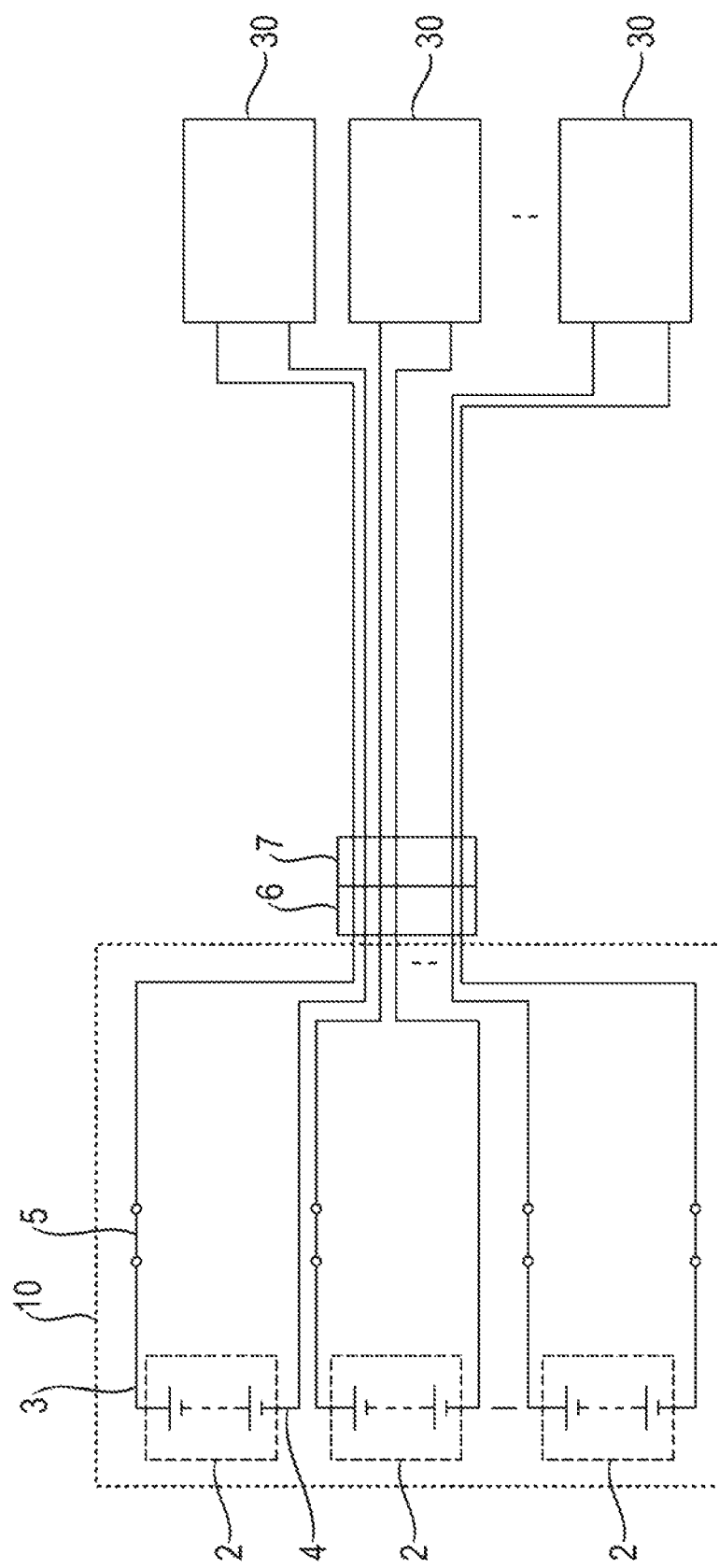
FIG. 3 shows a schematic illustration of an apparatus for carrying out the method according to aspects of the invention for charging the battery system.

FIG. 3 shows an embodiment of the battery 10 according to aspects of the invention, which is connected to a series of charging devices 30 by means of the first interface 6 and a second interface 7. In the charge mode, all the switches 5 in the battery 10 are closed such that the modules 2 can be charged. In the embodiment shown in FIG. 3, N charging devices are connected to the second interface 7. N modules 2 can be charged in parallel by means of the intermediate poles of the battery 10, said poles being connected to the interface 6.

In the embodiment shown in FIG. 3, N is the total number of modules 2 of the battery 10, that is to say each module 2 of the battery 10 is connected to a charging device 30. In other embodiments, a charging device 30 is connected to the positive and negative pole of a section of a plurality of modules 2 connected in series. In another embodiment, not all the modules 2 are connected to a charging device 30 at the same time, but rather just one single module 2, or a number or a group of modules 2 smaller than the total number of modules 2.

In the embodiment shown in FIG. 3, wherein each module 2 is connected to a charging device 30 and all the modules 2 are charged in parallel, all the charging devices 30 deliver the same current but in each case only 1/N of the rated voltage of the battery 10.

The charging method according to aspects of the invention that uses a divided charging connection system permits the use of less powerful charging devices. As a result, it is also possible to use charging devices that deliver a lower output voltage since the total rated voltage of the battery does not have to be provided by a single charging device.

What is claimed is:

1. A power supply for a vehicle drive electric machine comprising:
    a battery system including:
        at least two modules, each module having at least two cells connected in series, a positive pole, and a negative pole;
        a first interface having a number of connections equal to double the number of the at least two modules; and
        conductors that connect the positive poles and the negative poles to respective connections on the first interface, wherein the conductors that connect the positive poles of the modules to the first interface each have a switch, which is open when the associated connection of the first interface is open;
    a second interface having the same number of connections as the first interface of the battery system;
    a number of fuses corresponding to a number of modules in the battery system reduced by one; and
    a converter;
    wherein each connection of the second interface is connected to a respective connection of the first interface, and each fuse is connected to a respective positive pole of one of the modules of the battery system and to a respective negative pole of another of the modules of the battery system such that all the modules of the battery system are connected in series by the fuses, and wherein two remaining connections of the second interface are connected to an input of the converter.

2. The power supply as claimed in claim 1, wherein the battery system is a high-voltage (HV) battery system.

3. The power supply as claimed in claim 1, wherein a sum of voltages of the at least two modules is greater than 800 V.

4. The power supply as claimed in claim 1, wherein the first interface is a high-voltage (HV) plug connector.

5. The power supply as claimed in claim 1, wherein the switches are embodied as electrically or electronically operated switches.

6. The power supply as claimed in claim 1, wherein the converter comprises an inverter.

7. The power supply as claimed in claim 1, wherein the converter comprises a step-down converter.

8. The power supply as claimed in claim 1, wherein at least one of the fuses is a safety fuse.

9. The power supply as claimed in claim 1, wherein at least one of the fuses is an electronic fuse.

10. The power supply as claimed in claim 1, wherein the first interface and the second interface together form a high-voltage (HV) plug connection.

11. A method for charging a battery system, the method comprising:
    connecting at least one charging device to at least one module of the battery system, wherein the battery system includes:
        at least two modules, each module having at least two cells connected in series, a positive pole, and a negative pole;
        a first interface having a number of connections equal to double the number of the at least two modules; and
        conductors that connect the positive poles and the negative poles to respective connections on the first interface, wherein the conductors that connect the positive poles of the modules to the first interface each have a switch, which is open when the associated connection of the first interface is open; and
    charging the battery system, wherein:
        a plurality of charging devices are in each case connected simultaneously to at least one module and the modules connected to the charging devices are charged simultaneously.

12. The method as claimed in claim 11, wherein a number of charging devices is equal to a number of modules in the battery system.

* * * * *